(12) United States Patent
Ono

(10) Patent No.: US 12,266,133 B2
(45) Date of Patent: Apr. 1, 2025

(54) IMAGE CAPTURE APPARATUS AND CONTROL METHOD THEREOF

(71) Applicant: CANON KABUSHIKI KAISHA, Tokyo (JP)

(72) Inventor: Tadayoshi Ono, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 127 days.

(21) Appl. No.: 18/167,410

(22) Filed: Feb. 10, 2023

(65) Prior Publication Data

US 2023/0260150 A1    Aug. 17, 2023

(30) Foreign Application Priority Data

Feb. 15, 2022  (JP) ................................ 2022-021432

(51) Int. Cl.
*G06T 7/70* (2017.01)
*H04N 23/66* (2023.01)

(52) U.S. Cl.
CPC .............. *G06T 7/70* (2017.01); *H04N 23/66* (2023.01); *G06T 2207/30244* (2013.01)

(58) Field of Classification Search
CPC . G06T 7/70; G06T 2207/30244; H04N 23/66; H04N 23/667; H04N 23/6812
See application file for complete search history.

(56) References Cited

U.S. PATENT DOCUMENTS 11,375,179 B1 *  6/2022  Clemens .............. H04N 13/111

FOREIGN PATENT DOCUMENTS

JP            3631151 B2     3/2005
WO   WO-2023095392 A1 *  6/2023

* cited by examiner

*Primary Examiner* — Kathleen V Nguyen
(74) *Attorney, Agent, or Firm* — Canon U.S.A., Inc. IP Division

(57) ABSTRACT

An image capture apparatus comprises a controller that controls the image capture apparatus so as to output, to an external, data of a first image for detecting a position and orientation of the image capture apparatus, and capture a second image of an external display apparatus displaying the first image, The controller further controls the image capture apparatus so as to capture, a third image, of which background is the external display apparatus displaying a fourth image that is generated in accordance with the position and orientation of the image capture apparatus detected based on data of the second image data.

9 Claims, 17 Drawing Sheets

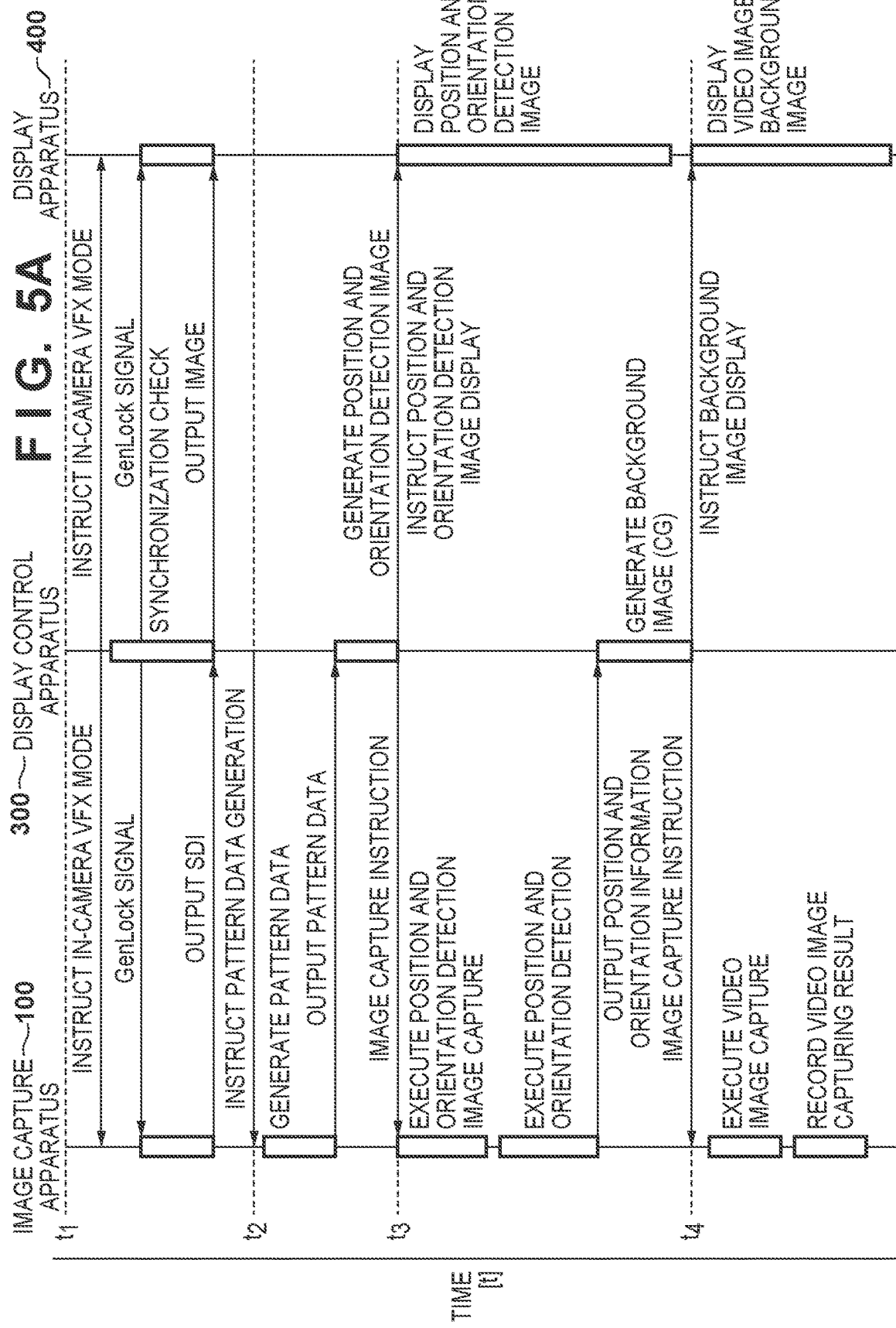

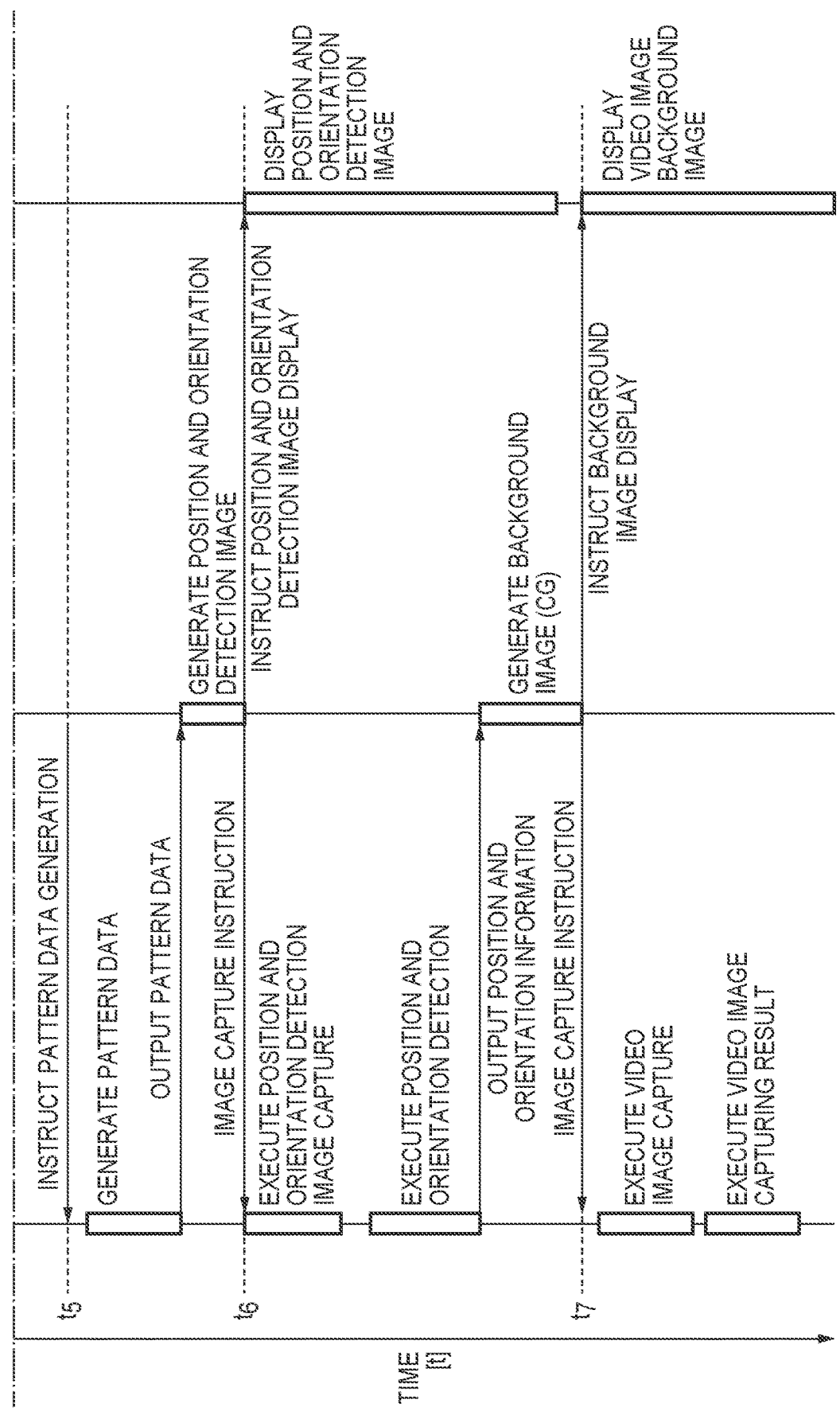

FIG. 6A

| (1,1) | (2,1) | (3,1) | (4,1) | (5,1) | (6,1) | (7,1) | (8,1) | (9,1) | (10,1) | (11,1) | (12,1) | (13,1) | (14,1) | (15,1) | (16,1) | (17,1) | (18,1) | (19,1) | (20,1) | (21,1) | (22,1) |
| --- | --- | --- | --- | --- | --- | --- | --- | --- | --- | --- | --- | --- | --- | --- | --- | --- | --- | --- | --- | --- | --- |
| (1,2) | (2,2) | (3,2) | (4,2) | (5,2) | (6,2) | (7,2) | (8,2) | (9,2) | (10,2) | (11,2) | (12,2) | (13,2) | (14,2) | (15,2) | (16,2) | (17,2) | (18,2) | (19,2) | (20,2) | (21,2) | (22,2) |
| (1,3) | (2,3) | (3,3) | (4,3) | (5,3) | (6,3) | (7,3) | (8,3) | (9,3) | (10,3) | (11,3) | (12,3) | (13,3) | (14,3) | (15,3) | (16,3) | (17,3) | (18,3) | (19,3) | (20,3) | (21,3) | (22,3) |
| (1,4) | (2,4) | (3,4) | (4,4) | (5,4) | (6,4) | (7,4) | (8,4) | (9,4) | (10,4) | (11,4) | (12,4) | (13,4) | (14,4) | (15,4) | (16,4) | (17,4) | (18,4) | (19,4) | (20,4) | (21,4) | (22,4) |
| (1,5) | (2,5) | (3,5) | (4,5) | (5,5) | (6,5) | (7,5) | (8,5) | (9,5) | (10,5) | (11,5) | (12,5) | (13,5) | (14,5) | (15,5) | (16,5) | (17,5) | (18,5) | (19,5) | (20,5) | (21,5) | (22,5) |
| (1,6) | (2,6) | (3,6) | (4,6) | (5,6) | (6,6) | (7,6) | (8,6) | (9,6) | (10,6) | (11,6) | (12,6) | (13,6) | (14,6) | (15,6) | (16,6) | (17,6) | (18,6) | (19,6) | (20,6) | (21,6) | (22,6) |
| (1,7) | (2,7) | (3,7) | (4,7) | (5,7) | (6,7) | (7,7) | (8,7) | (9,7) | (10,7) | (11,7) | (12,7) | (13,7) | (14,7) | (15,7) | (16,7) | (17,7) | (18,7) | (19,7) | (20,7) | (21,7) | (22,7) |
| (1,8) | (2,8) | (3,8) | (4,8) | (5,8) | (6,8) | (7,8) | (8,8) | (9,8) | (10,8) | (11,8) | (12,8) | (13,8) | (14,8) | (15,8) | (16,8) | (17,8) | (18,8) | (19,8) | (20,8) | (21,8) | (22,8) |
| (1,9) | (2,9) | (3,9) | (4,9) | (5,9) | (6,9) | (7,9) | (8,9) | (9,9) | (10,9) | (11,9) | (12,9) | (13,9) | (14,9) | (15,9) | (16,9) | (17,9) | (18,9) | (19,9) | (20,9) | (21,9) | (22,9) |
| (1,10) | (2,10) | (3,10) | (4,10) | (5,10) | (6,10) | (7,10) | (8,10) | (9,10) | (10,10) | (11,10) | (12,10) | (13,10) | (14,10) | (15,10) | (16,10) | (17,10) | (18,10) | (19,10) | (20,10) | (21,10) | (22,10) |

POSITION AND ORIENTATION DETECTION IMAGE

FIG. 6B

IMAGE OF ORIENTATION DETECTION IMAGE CAPTURE RESULT AT TIME $t_3$ (WITHIN THICK FRAME)

FIG. 9A

| (1,1) | (2,1) | (3,1) | (4,1) | (5,1) | (6,1) | (7,1) | (8,1) | (9,1) | (10,1) | (11,1) | (12,1) | (13,1) | (14,1) | (15,1) | (16,1) | (17,1) | (18,1) | (19,1) | (20,1) | (21,1) | (22,1) |
|---|---|---|---|---|---|---|---|---|---|---|---|---|---|---|---|---|---|---|---|---|---|
| (1,2) | (2,2) | (3,2) | (4,2) | (5,2) | (6,2) | (7,2) | (8,2) | (9,2) | (10,2) | (11,2) | (12,2) | (13,2) | (14,2) | (15,2) | (16,2) | (17,2) | (18,2) | (19,2) | (20,2) | (21,2) | (22,2) |
| (1,3) | (2,3) | (3,3) | (4,3) | (5,3) | (6,3) | (7,3) | (8,3) | (9,3) | (10,3) | (11,3) | (12,3) | (13,3) | (14,3) | (15,3) | (16,3) | (17,3) | (18,3) | (19,3) | (20,3) | (21,3) | (22,3) |
| (1,4) | (2,4) | (3,4) | (4,4) | (5,4) | (6,4) | (7,4) | (8,4) | (9,4) | (10,4) | (11,4) | (12,4) | (13,4) | (14,4) | (15,4) | (16,4) | (17,4) | (18,4) | (19,4) | (20,4) | (21,4) | (22,4) |
| (1,5) | (2,5) | (3,5) | (4,5) | (5,5) | (6,5) | (7,5) | (8,5) | (9,5) | (10,5) | (11,5) | (12,5) | (13,5) | (14,5) | (15,5) | (16,5) | (17,5) | (18,5) | (19,5) | (20,5) | (21,5) | (22,5) |
| (1,6) | (2,6) | (3,6) | (4,6) | (5,6) | (6,6) | (7,6) | (8,6) | (9,6) | (10,6) | (11,6) | (12,6) | (13,6) | (14,6) | (15,6) | (16,6) | (17,6) | (18,6) | (19,6) | (20,6) | (21,6) | (22,6) |
| (1,7) | (2,7) | (3,7) | (4,7) | (5,7) | (6,7) | (7,7) | (8,7) | (9,7) | (10,7) | (11,7) | (12,7) | (13,7) | (14,7) | (15,7) | (16,7) | (17,7) | (18,7) | (19,7) | (20,7) | (21,7) | (22,7) |
| (1,8) | (2,8) | (3,8) | (4,8) | (5,8) | (6,8) | (7,8) | (8,8) | (9,8) | (10,8) | (11,8) | (12,8) | (13,8) | (14,8) | (15,8) | (16,8) | (17,8) | (18,8) | (19,8) | (20,8) | (21,8) | (22,8) |
| (1,9) | (2,9) | (3,9) | (4,9) | (5,9) | (6,9) | (7,9) | (8,9) | (9,9) | (10,9) | (11,9) | (12,9) | (13,9) | (14,9) | (15,9) | (16,9) | (17,9) | (18,9) | (19,9) | (20,9) | (21,9) | (22,9) |
| (1,10) | (2,10) | (3,10) | (4,10) | (5,10) | (6,10) | (7,10) | (8,10) | (9,10) | (10,10) | (11,10) | (12,10) | (13,10) | (14,10) | (15,10) | (16,10) | (17,10) | (18,10) | (19,10) | (20,10) | (21,10) | (22,10) |

POSITION AND ORIENTATION DETECTION IMAGE

IMAGE OF ORIENTATION DETECTION IMAGE CAPTURE RESULT AT TIME $t_5$ (WITHIN THICK FRAME)

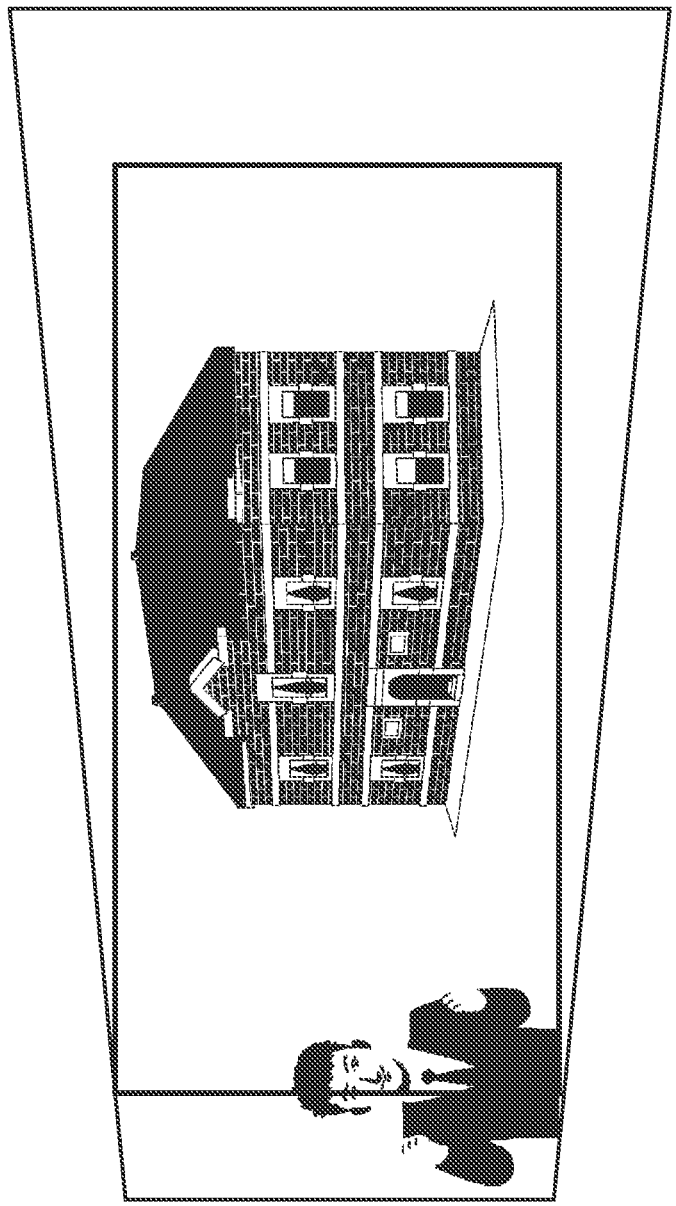

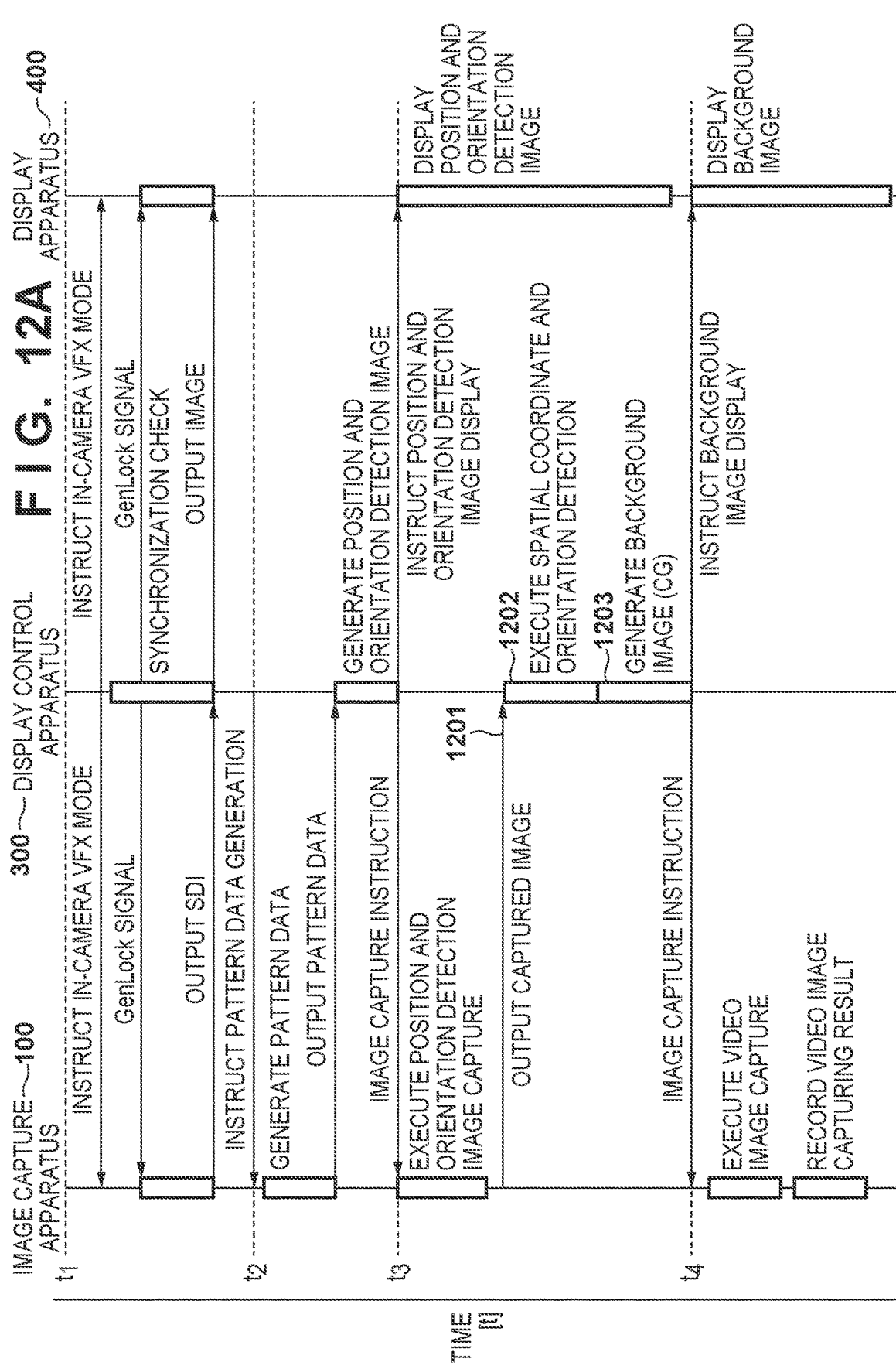

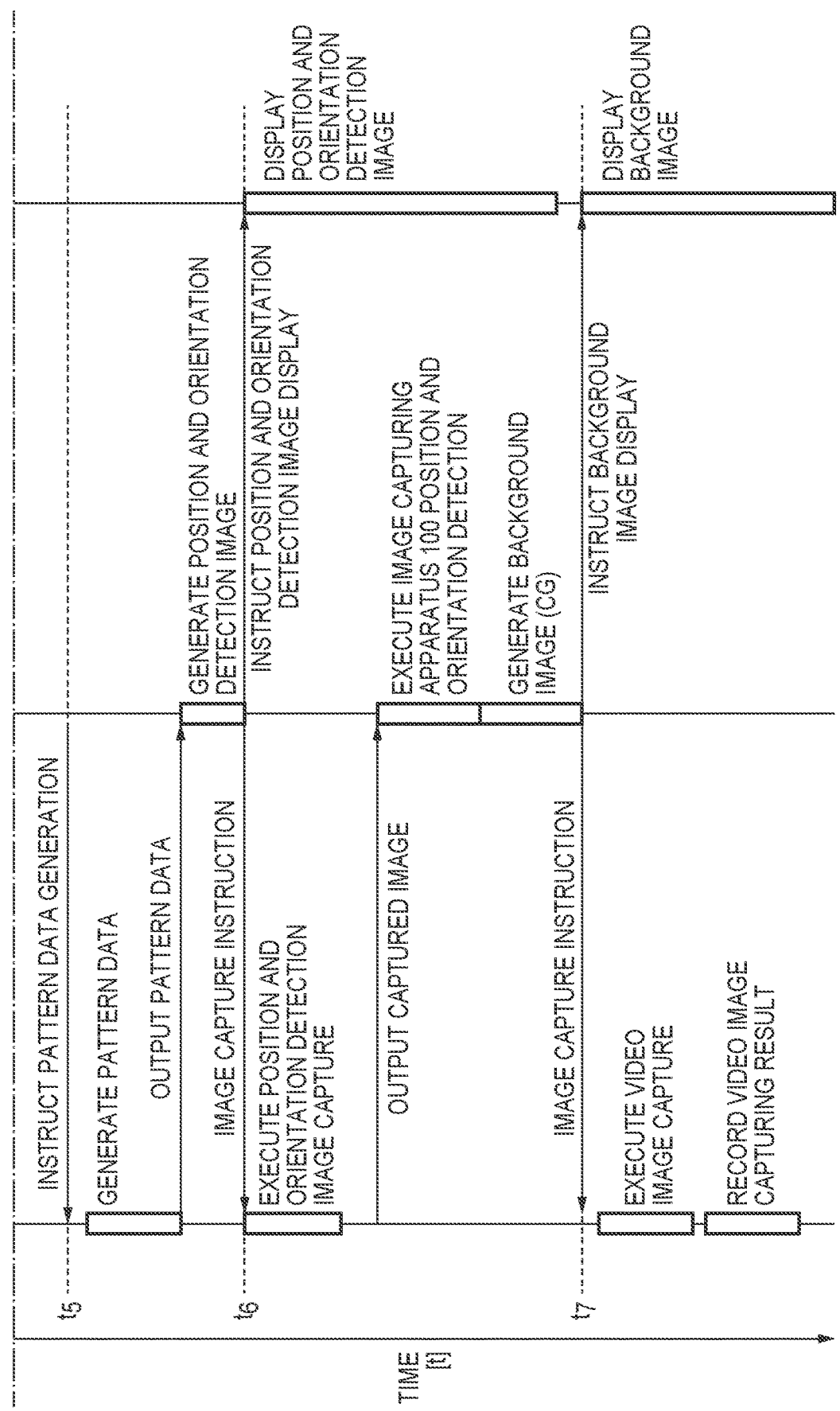

IMAGE CAPTURE APPARATUS AND CONTROL METHOD THEREOF

BACKGROUND

Field of the Disclosure

The present disclosure relates to an image capture apparatus and a control method thereof, and particularly relates to a technique for estimating a position and orientation of the image capture apparatus.

Description of the Related Art

Visual Effects (VFX) techniques, which generate images of unrealistic scenes by compositing computer graphics (CG) with live-action video, are attracting attention. A method is also known for obtaining VFX images without compositing processing by capturing a subject against a background of a display apparatus or a screen that displays CG (in-camera VFX).

To achieve VFX which is not unnatural, it is necessary to match the position and orientation of a virtual camera when rendering CG with the position and orientation of the camera capturing the live-action video. As such, it is necessary to detect the position and orientation of the camera and change the CG according to the detected position and orientation.

Thus far, the position and orientation of a camera are detected using a device separate from the camera. For example, a camera tracking system is known which uses a device attached to a camera to detect the position and orientation of the camera by capturing images of a plurality of markers placed at known positions and receiving signals from a plurality of transmitters placed at known positions (Japanese Patent No. 3631151).

However, such a camera tracking system requires that markers and transmitters be placed at known positions and that a device be attached to the camera, which makes the installation burdensome and expensive.

SUMMARY

The present disclosure has been conceived in light of these issues with conventional techniques. Embodiments of the present disclosure provides, in one aspect, an image capture apparatus, and a control method thereof, that realizes in-camera VFX through a simple method.

According to an aspect of the present disclosure, there is provided an image capture apparatus comprising: one or more processors that execute a program stored in a memory and thereby function as a controller that controls operation of the image capture apparatus, wherein the controller controls the image capture apparatus so as to: (1) output, to an external, data of a first image for detecting a position and orientation of the image capture apparatus; (2) capture a second image of an external display apparatus displaying the first image; and (3) capture, a third image, of which background is the external display apparatus displaying a fourth image that is generated in accordance with the position and orientation of the image capture apparatus detected based on data of the second image data.

According to another aspect of the present disclosure, there is provided a control method executed by an image capture apparatus, the control method comprising: (1) outputting, to an external, data of a first image for detecting a position and orientation of the image capture apparatus; (2) capturing a second image of an external display apparatus displaying the first image; and (3) capturing, a third image, of which background is the external display apparatus displaying a fourth image that is generated in accordance with the position and orientation of the image capture apparatus detected based on data of the second image data.

According to a further aspect of the present disclosure, there is provided a non-transitory computer-readable medium storing one or more programs including executable instructions for causing a computer of an image capture apparatus to perform operations comprising: (1) outputting, to an external, data of a first image for detecting a position and orientation of the image capture apparatus; (2) capturing a second image of an external display apparatus displaying the first image; and (3) capturing, a third image, of which background is the external display apparatus displaying a fourth image that is generated in accordance with the position and orientation of the image capture apparatus detected based on data of the second image data.

Further features of some embodiments of the present disclosure will become apparent from the following description of exemplary embodiments (with reference to the attached drawings).

BRIEF DESCRIPTION I/F THE DRAWINGS

FIGS. 5A and 5B are timing charts pertaining to operations by the image capture system according to a first embodiment.

FIGS. 6A and 6B are diagrams illustrating an example of pattern data and a position detection image capture result according to embodiments.

FIGS. 9A and 9B are diagrams illustrating an example of pattern data and a position detection image capture result obtained after the image capture apparatus 100 has moved, according to embodiments.

FIGS. 10A and 10B are diagrams illustrating changes in the background image and the video image capturing resulting from the image capture apparatus moving.

FIGS. 12A and 12B are timing charts pertaining to operations by the image capture system according to the second embodiment.

DESCRIPTION OF THE EMBODIMENTS

Figure 1:
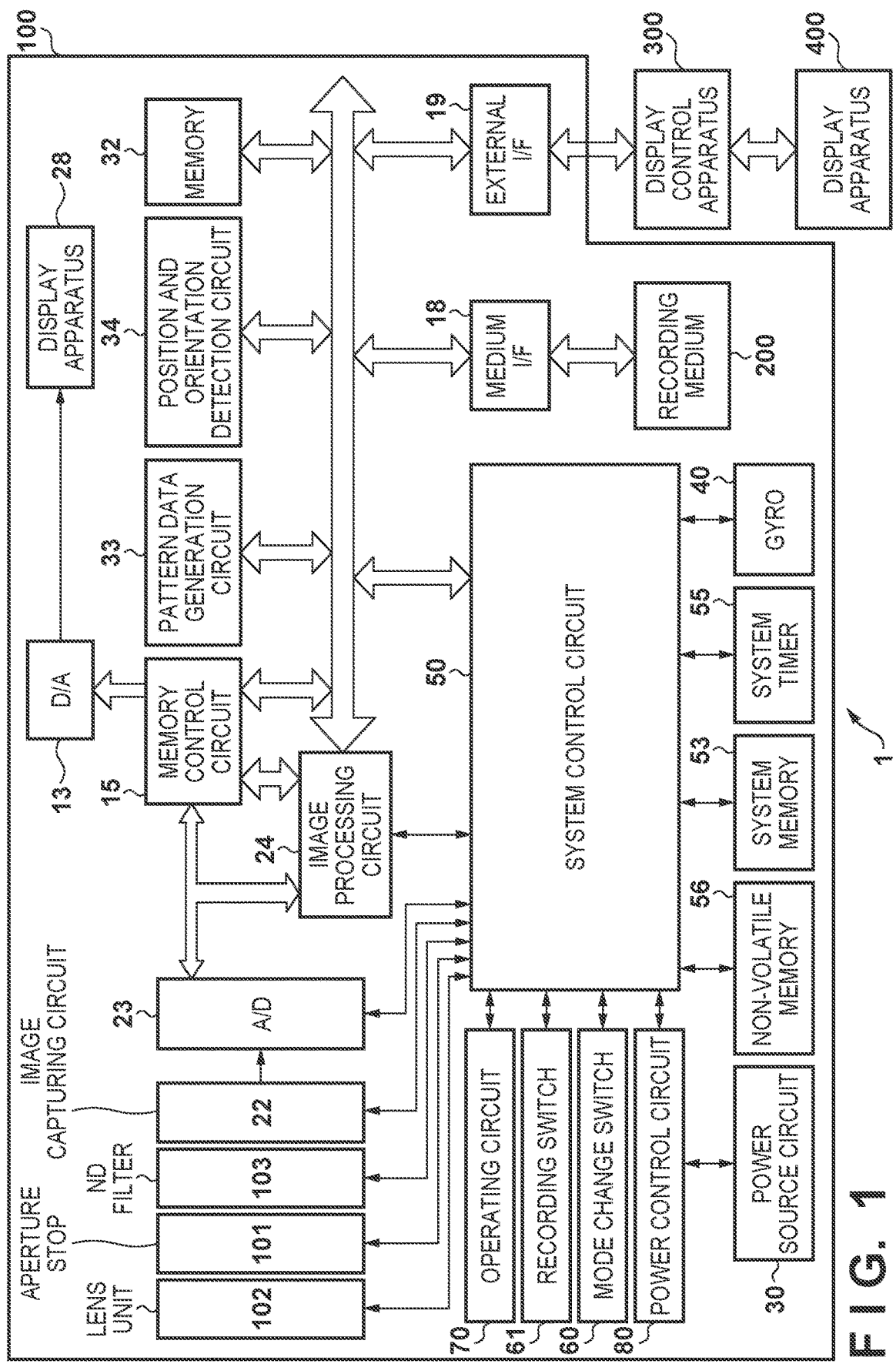
FIG. 1 is a block diagram illustrating an example of the functional configuration of an image capture apparatus 100 according to embodiments.

Hereinafter, embodiments will be described in detail with reference to the attached drawings. Note, the following embodiments are not intended to limit the scope of the claims. Multiple features are described in the embodiments, but limitation is not made to an embodiment that requires all such features, and multiple such features may be combined as appropriate. Furthermore, in the attached drawings, the same reference numerals are given to the same or similar configurations, and redundant description thereof is omitted.

Note that the following embodiments will describe a case where the embodiment are applied in an image capture apparatus (a digital video camera). However, an image capture function is not essential to the embodiments, and the embodiments can be implemented in any electronic device capable of processing image data. Examples of such an electronic device include computer devices (personal computers, tablet computers, media players, PDAs, and the like), mobile phones, smartphones, game consoles, robots, drones, and the like. These are merely examples, however, and the embodiments can be applied in other electronic devices as well.

FIG. 1 is a block diagram illustrating an example of the configuration of an image capture system, including an example of the functional configuration of an image capture apparatus 100 capable of implementing the present embodiment. An image capture system 1 includes the image capture apparatus 100, a display control apparatus 300, and a display apparatus 400.

The image capture apparatus 100 has a function for detecting its own position and orientation from captured images, which will be described later. The image capture apparatus 100 outputs information on the detected position and orientation to the display control apparatus 300.

The display control apparatus 300 renders CG based on the information on the position and orientation of the image capture apparatus 100 obtained from the image capture apparatus 100. The display control apparatus 300 converts the obtained CG into a video signal suitable for the display apparatus 400 and then outputs the signal to the display apparatus 400. The display control apparatus 300 may be a computer device which has an interface capable of communicating with the image capture apparatus 100 and the display apparatus 400, and which runs software that renders CG, converts CG to video signals, and the like.

The display apparatus 400 performs displays based on the video signal supplied from the display control apparatus 300. The display apparatus 400 may be a flat panel display such as a liquid crystal display (LCD), or a combination of a projector and a screen. A plurality of displays or projectors may also be used.

The present embodiment assumes that the image capture apparatus 100 and the display apparatus 400 support the input/output of synchronization signals (e.g., GenLock signals) for synchronizing the operations of the image capture apparatus 100 and the display apparatus 400.

The configuration of the image capture apparatus 100 will be described next. A lens unit 102 is an optical system that forms an optical image of a subject. The lens unit 102 is constituted by a plurality of lenses, including a movable lens and a fixed lens. The movable lens includes at least a focus lens, and may include at least one of a zoom lens and a shift lens.

A gyro 40 is a motion sensor that outputs a signal representing motion of the image capture apparatus 100. The gyro 40 is a three-axis angular velocity sensor that detects angular velocity around three axes, namely an axis parallel to the optical axis of the lens unit 102, an axis parallel to the direction of gravity, and an axis orthogonal to these two axes, for example. Note that sensors that detect acceleration in each axis direction may be used in combination.

A system control circuit (controller) 50 (described later) detects the motion of the image capture apparatus 100 from the output of the gyro 40. The system control circuit 50 implements an image stabilization function by controlling the position of the shift lens in the lens unit 102, a position at which an image processing circuit 24 crops a captured image, and the like according to the detected motion.

An aperture value of an aperture stop 101 can be adjusted by control performed by the system control circuit 50. Light passing through the lens unit 102 passes through an opening in the aperture stop 101 and a Neutral Density (ND) filter 102, which is inserted into the optical path as necessary, to form a subject optical image on an image capture surface of an image capture circuit 22.

The image capture circuit 22 includes an image sensor, as well as peripheral circuitry that adjusts the gain, reduces noise, and so on for a signal read out from the image sensor. The image sensor may be a publicly-known CCD or CMOS color image sensor having, for example, a primary color Bayer array color filter. The image sensor includes a pixel array, in which a plurality of pixels are arranged two-dimensionally, and peripheral circuitry for reading out signals from the pixels. Each pixel accumulates a charge corresponding to an amount of incident light through photoelectric conversion. By reading out, from each pixel, a signal having a voltage corresponding to the charge amount accumulated during an exposure period, a group of pixel signals (analog image signals) representing a subject image formed on the image capture surface is obtained.

An A/D converter 23 converts the analog image signals output from the image capture circuit 22 into digital image signals (image data). Note that when an image sensor having an A/D conversion function, a photon counting-type image sensor, or the like is used, the A/D converter 23 is not necessary.

The image processing circuit 24 generates signals and image data for different purposes, obtains and/or generates various types of information, and so on by applying predetermined image processing to the image data output by the A/D converter 23. The image processing circuit 24 may be a dedicated hardware circuit, such as an Application Specific Integrated Circuit (ASIC) designed to implement a specific function, for example. Alternatively, the image processing circuit 24 may be constituted by a processor such as a Digital Signal Processor (DSP) or a Graphics Processing Unit (GPU) executing software to implement a specific function.

The image processing applied by the image processing circuit 24 can include preprocessing, color interpolation processing, correction processing, detection processing, data processing, evaluation value calculation processing, special effect processing, and so on, for example.

The preprocessing includes signal amplification, reference level adjustment, defective pixel correction, and the like.

The color interpolation processing is performed when the image sensor is provided with a color filter, and interpolates the values of color components that are not included in the individual pixel data constituting the image data. Color interpolation processing is also called "demosaicing".

The correction processing can include white balance adjustment, tone adjustment, correction of image degradation caused by optical aberrations of an image capturing optical system 101 (image restoration), correction of the effects of vignetting in the image capturing optical system 101, color correction, and the like.

The detection processing includes detecting a feature region (e.g., a face region or a human body region) or motion in such a region, processing for recognizing a person, or the like.

The data processing can include cropping, compositing, scaling, encoding and decoding, and header information generation (data file generation). The generation of display image data and recording image data is also included in the data processing. An electronic anti-shake function is realized by moving a region to be cropped according to motion of the image capture apparatus 100 detected by the gyro 40.

The evaluation value calculation processing can include processing such as generating signals, evaluation values, and the like used in automatic focus detection (AF), generating evaluation values used in automatic exposure control (AE), and the like.

The special effect processing includes adding bokeh effects, changing color tones, relighting processing, and the like.

Note that these are merely examples of the processing that can be applied by the image processing circuit 24, and the processing applied by the image processing circuit 24 is not limited thereto.

The image data output by the A/D converter 23 may be stored in a memory 32. The memory 32 is used, for example, as an image data buffer, as working memory for the image processing circuit 24, and the like. Part of the memory 32 is also used as video memory for a display apparatus 28.

A D/A converter 13 converts image data for display, stored in the video memory region of the memory 32, into an analog image signal suitable for display in the display apparatus 28, and supplies that signal to the display apparatus 28. The display apparatus 28 includes, for example, an LCD, and performs displays according to the analog image signal supplied from the D/A converter 13.

When the image capture apparatus 100 is in an image capture standby state, the system control circuit 50 continuously causes the image capture circuit 22 to capture a moving image, the image processing circuit 24 to generate display image data and store the display image data in the memory 32, and the D/A converter 13 to generate the analog image signal. As a result, the display apparatus 28 can be caused to function as an electronic viewfinder (EVF).

A non-volatile memory 56 is an electrically erasable/recordable memory, e.g., EEPROM. The non-volatile memory 56 stores programs executed by the system control circuit 50, constants, setting values for the image capture apparatus 100, Graphical User Interface (GUI) data, and the like.

The system control circuit 50 is, for example, a CPU (also called an "MPU" or a "microprocessor"). The system control circuit 50 controls the operations of the respective units of the image capture apparatus 100, and implements the functions of the image capture apparatus 100, by loading programs stored in the non-volatile memory 56 into a system memory 53 and executing the programs.

The system memory 53 is RAM, and is used to store programs read out from the non-volatile memory 56, temporarily store constants, variables, and the like required by the system control circuit 50 to execute the programs, and so on. Note that the system memory 53 and the memory 32 may share a single memory space.

A system timer 56 supplies operating clock signals to the system control circuit 50, the image capture circuit 22, the memory 32, the system memory 53, and the like. The system timer 56 has a time measurement function, and provides date/time information. Furthermore, the system timer 56 provides a timer function for measuring a predetermined length of time.

"Operating unit 70" is a collective name for input devices (buttons, switches, dials, and the like) provided for a user to input various types of instructions to the image capture apparatus 100. The operating unit 70 also includes a mode change switch 60 and a recording switch 61. The input devices constituting the operating unit 70 are named according to the functions assigned thereto. Note that the functions assigned to the same input device may be variable.

For example, the operating unit 70 includes a menu button, a directional key, a set key, and the like. When the menu button is operated, the system control circuit 50 displays a menu screen in the display apparatus 28. Additionally, when the directional key is pressed while the menu screen is displayed, the system control circuit 50 changes selected items, changes the displayed content, and the like. Additionally, when the set key is operated, the system control circuit 50 changes settings, executes operations, and so on according to the item selected at that point in time.

When the mode change switch 60 is operated, the system control circuit 50 switches an operating mode of the image capture apparatus 100 to one of a plurality of operating modes, such as a recording mode, a playback mode, an in-camera VFX mode, and the like, in accordance with the operation of the mode change switch 60.

The recording switch 61 switches between starting the recording of a moving image and a standby state. Upon detecting the recording switch 61 being operated while in the image capture standby state, the system control circuit 50 starts moving image recording operations.

Note that if the display apparatus 28 is a touch screen, software keys using GUI images displayed in the display apparatus 28 are also included in the operating unit 70.

A power control circuit 80 supplies power necessary for operations to the respective units of the image capture apparatus 100 based on power supplied from a power source circuit 30, which is a battery, for example.

A medium I/F 18 is an interface for the system control circuit 50 to access a recording medium 200 such as a memory card or the like.

An external I/F 19 is an interface for outputting signals to an external device, communicating with an external device, and the like. The external I/F 19 is provided with an interface and a connector compliant with a standard such as SDI, HDMI (registered trademark), USB, or the like, for example. The external I/F 19 can also output signals for synchronizing an external device with the image capture apparatus 100, such as a timecode, a GenLock signal, or the like.

Additionally, the system control circuit 50 can control the operations of the image capture apparatus 100 based on signals or commands input from an external device through the external I/F 19. When an external device is connected to the external I/F 19, the system control circuit 50 performs predetermined communication with the external device and recognizes the type of the external device, confirms a range of operations which can be mutually controlled, and the like. The system control circuit 50 also obtains information on the display apparatus 400 connected to the display control apparatus 300 through the display control apparatus 300, which is connected to the external I/F 19.

A pattern data generation circuit 33 generates pattern data for display in the display apparatus 400 in order to detect the position and orientation of the image capture apparatus 100, and supplies the pattern data to the external I/F 19. The pattern data may be data representing the entire image to be displayed, or may be data representing part (e.g., a repeating unit). In the latter case, the display control apparatus 300 processes data representing the entire image before displaying the data in the display apparatus 400.

A position and orientation detection circuit 34 detects the position and orientation of the image capture apparatus 100 relative to the display apparatus 400 based on an image captured of the display apparatus 400 when the display apparatus 400 displays an image based on the pattern data generated by the pattern data generation circuit 33.

The display control apparatus 300 is a general-purpose computer device including an interface for connecting the image capture apparatus 100 and the display apparatus 400, and executes the operations described below by running a display control application.

Figure 2:
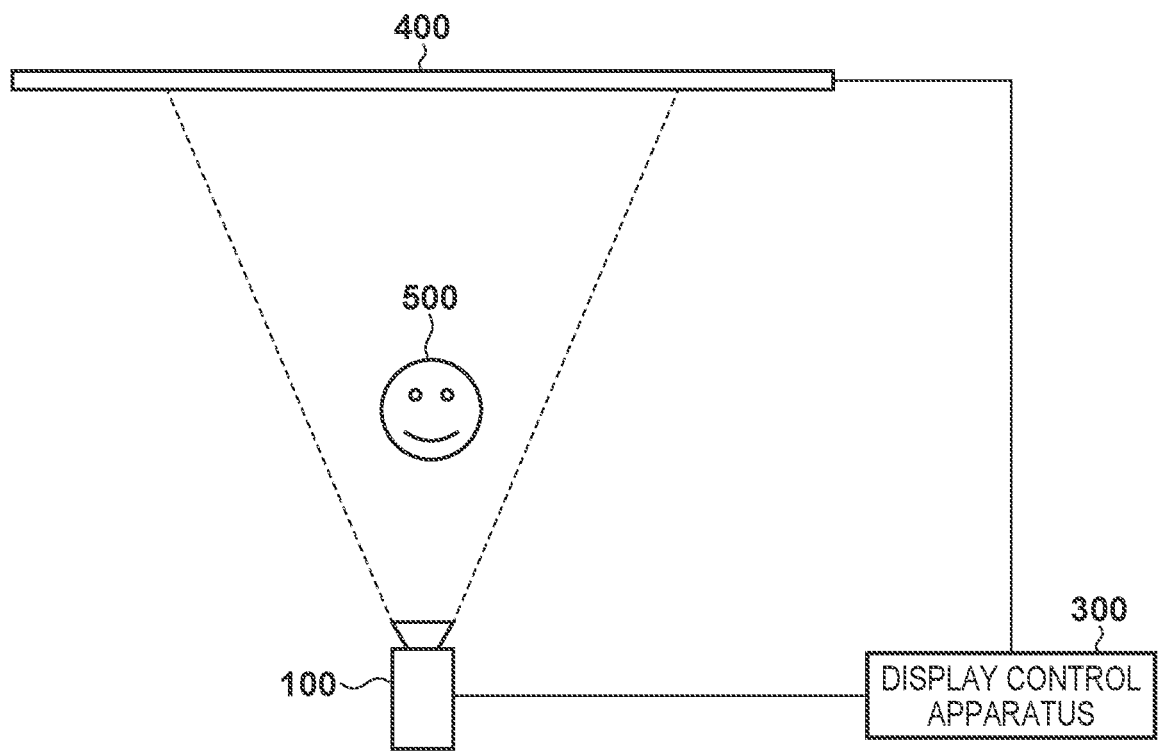
FIG. 2 is a schematic diagram of an image capture system according to embodiments.

FIG. 2 is a diagram schematically illustrating a positional relationship between the image capture apparatus 100, the display apparatus 400, and a subject 500 in the image capture system 1. FIG. 2 is an overhead view of a state in which the image capture apparatus 100 and the display apparatus 400 face each other, and the subject 500 to be captured is positioned between the display apparatus 400 and the image capture apparatus 100. The dotted lines indicate an image capture range (angle of view) of the image capture apparatus 100 in the horizontal direction.

Figure 3:
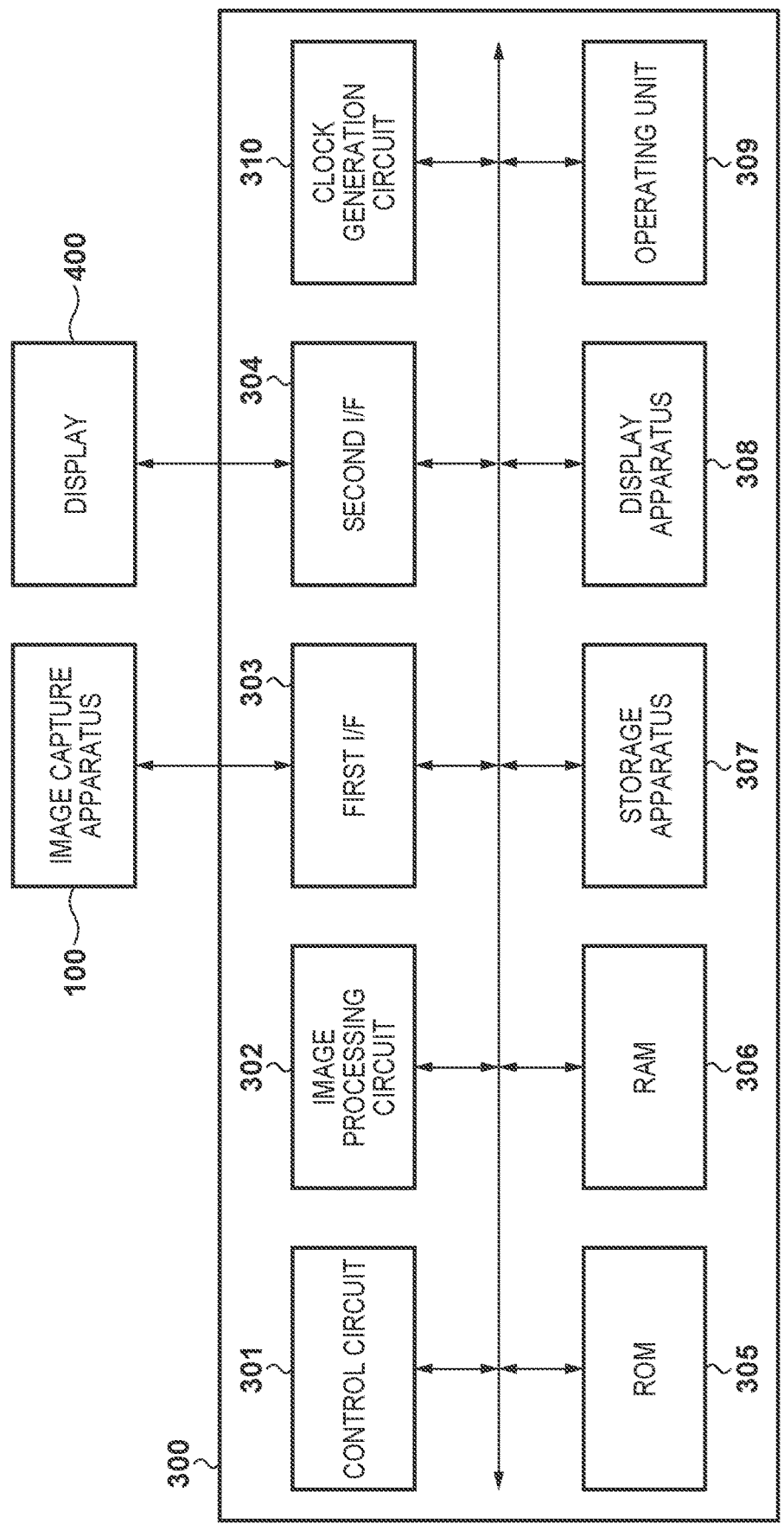
FIG. 3 is a block diagram illustrating an example of the functional configuration of a display control apparatus 300 according to embodiments.

FIG. 3 is a block diagram illustrating an example of the functional configuration of the display control apparatus 300. The display control apparatus 300 can be implemented using a computer device, for example.

A control circuit 301 is, for example, a CPU, which implements the functions of the display control apparatus 300 by loading a program (a display control application program) stored in a ROM 305 into a RAM 306 and executing the program.

An image processing circuit 302 is, for example, a graphics board including a GPU. The image processing circuit 302 is capable of executing image processing, such as CG rendering, at high speeds.

A first I/F 303 and a second I/F 304 are communication interfaces for connecting external devices, and the present embodiment assumes that the image capture apparatus 100 is connected to the first I/F 303 and the display apparatus 400 is connected to the second I/F 304. In the present embodiment, the first I/F 303 and the second I/F 304 are capable of transmitting video signals, synchronization signals, and control signals. Although the display control apparatus 300 and the image capture apparatus 100 are illustrated as being connected to a single I/F for the sake of simplicity, these apparatuses may be connected through different I/Fs according to the signals to be communicated. The same applies to the connection between the display control apparatus 300 and the display apparatus 400.

The control circuit 301 obtains information on the image capture apparatus 100 and the display apparatus 400, controls the operations of the image capture apparatus 100 and the display apparatus 400, and so on by communicating through the first I/F 303 and the second I/F 304. Note that the display control apparatus 300 may have at least three interfaces for communicating with external devices.

The ROM 305 stores programs executed by the control circuit 301 (firmware, an OS, application programs, and the like), GUI image data for menu screens and the like, setting values of the display control apparatus 300, and the like.

The RAM 306 is used as a main memory of the control circuit 301, as well as a working memory for an image processing circuit 125 and a video memory for a display apparatus 308.

A storage apparatus 307 is a high-capacity storage apparatus such as a hard disk, an SSD, or the like. Data required for rendering CG to be displayed in the display apparatus 400 is also stored in the storage apparatus 307.

The display apparatus 308 is a liquid crystal display apparatus, for example. The display apparatus 308 may be a touch screen. The display apparatus 308 displays screens of the display control application and the like.

An operation unit 309 includes a plurality of input devices which can be operated by a user, such as a keyboard, a mouse, a touch panel, and the like. If the display apparatus 308 is a touch screen, a touch panel constitutes the operation unit 309.

A clock generation circuit 310 generates synchronization signals for synchronizing the operations of the image capture apparatus 100 and the display apparatus 400. Note that synchronization signals may be obtained from an external device.

Figure 4:
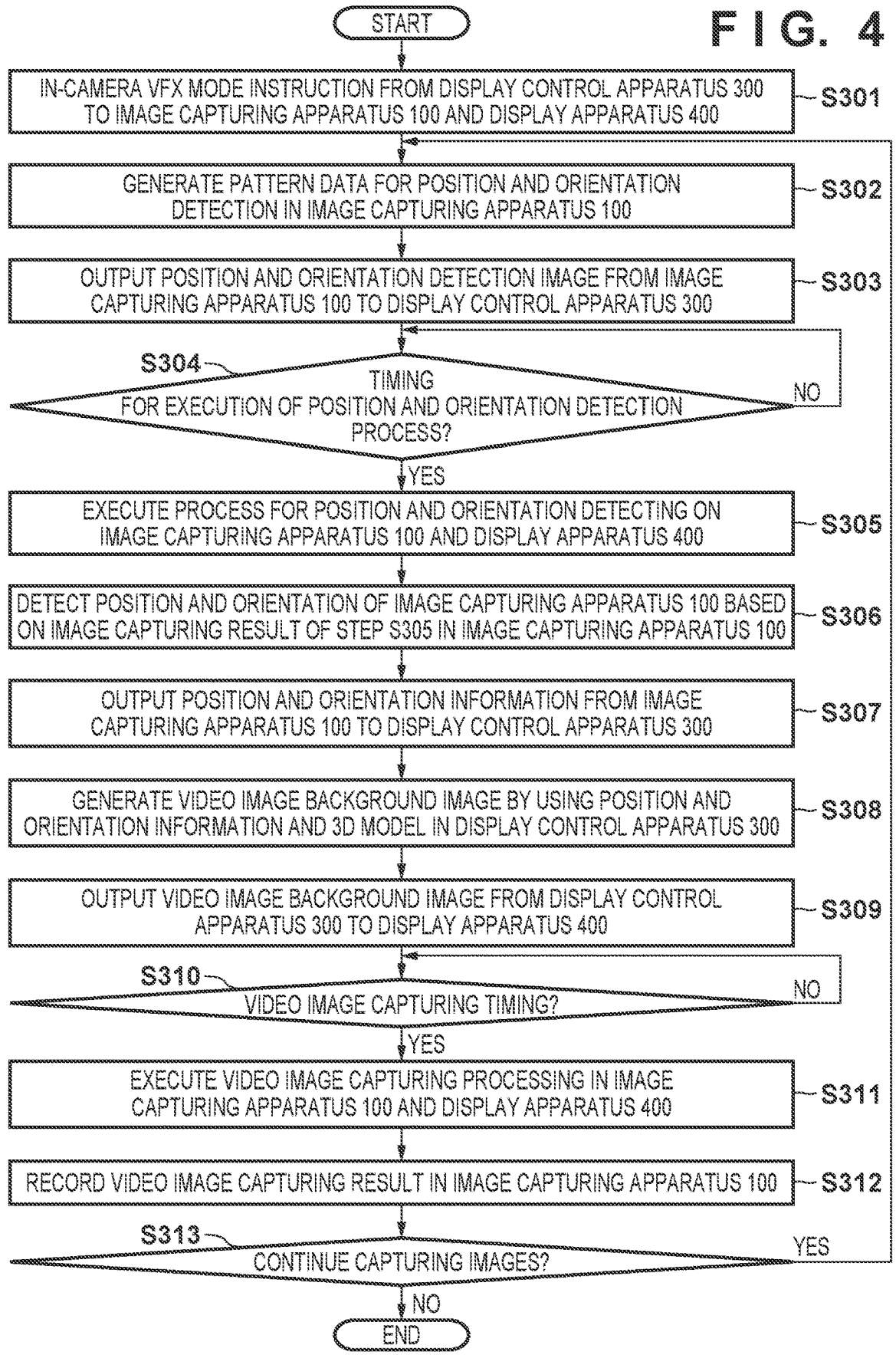
FIG. 4 is a flowchart pertaining to operations by the image capture system according to a first embodiment.

FIG. 4 is a flowchart pertaining to overall operations of the image capture system 1. Additionally, FIGS. 5A and 5B are timing charts illustrating operation timings of the respective apparatuses, with respect to the flowchart in FIG. 4. The operations of the image capture system 1 will be described hereinafter with reference to FIGS. 4 to 5B. Note that it is assumed that settings, connections, and the like necessary for the following operations are complete before the operations are started.

Specifically, it is assumed that the display control application is running in the display control apparatus 300, and that the display control apparatus 300 has obtained information necessary for controlling the operations of the image capture apparatus 100 and the display apparatus 400 from the image capture apparatus 100 and the display apparatus 400. For example, it is assumed that the display control apparatus 300 has already obtained an amount of delay between issuing an image capture instruction and image capturing being executed, an amount of delay between issuing a display instruction and the display being executed, and the like.

Note also that in the following descriptions, operations for which the image capture apparatus 100 is the main entity are executed by the system control circuit 50, and operations for which the display control apparatus 300 is the main entity are executed by the control circuit 301.

In step S301, a mode change instruction for changing to the in-camera VFX mode is issued from the display control apparatus 300 to the image capture apparatus 100 and the display apparatus 400 (FIG. 5A, time t1). The in-camera VFX mode is an operating mode in which display control and image capture control pertaining to the detection of the position and orientation of the image capture apparatus 100, and display control and image capture control for CG according to the detected position and orientation, are performed.

In the in-camera VFX mode, the image capture apparatus 100 captures a moving image, which includes frame capturing for position and orientation detection and frame capturing for recording. In response to the instructions from the display control apparatus 300, the image capture apparatus 100 captures each frame at timings synchronized with a reference clock signal supplied from the display control apparatus 300.

Additionally, to synchronize the operations of the image capture apparatus 100 and the display apparatus 400, the display control apparatus 300 supplies the reference clock signal (GenLock signal) to the image capture apparatus 100 and the display apparatus 400 from the clock generation circuit 310. The display control apparatus 300 confirms the synchronization of the image capture apparatus 100 and the display apparatus 400 by receiving, from the image capture apparatus 100 and the display apparatus 400, an indication that synchronization with the GenLock signal is complete. The display control apparatus 300 also notifies the image capture apparatus 100 and the display apparatus 400 of an operation cycle based on the GenLock signal.

Then, upon receiving a video signal from the image capture apparatus 100, the display control apparatus 300 outputs an image based on the video signal to the display apparatus 400, and instructs the image capture apparatus 100 to generate the pattern data for detecting the position and orientation.

In step S302, the pattern data generation circuit 33 of the image capture apparatus 100 generates the pattern data for detecting the position and orientation in response to the instruction from the display control apparatus 300. The pattern data is image data having features that enable the image capture apparatus 100 to identify, from a captured image of a display screen displaying an image based on the pattern data, which part of the display screen is being captured.

FIG. 6A illustrates an example of the image represented by the pattern data. FIG. 6A illustrates a state in which the pattern data is displayed throughout the entire display apparatus 400. The pattern data generation circuit 33 of the image capture apparatus 100 generates the pattern data based on information on the display apparatus 400 (e.g., the resolution of the display screen (the number of pixels in the horizontal direction and the vertical direction)).

For example, the image capture apparatus 100 divides the display screen in the display apparatus 400 into a plurality of blocks, and generates pattern data such that unique information is displayed in the individual blocks. Which range of the display screen has been captured by the image capture apparatus 100 can be identified from the unique information in the blocks included in the image obtained by capturing part of the display screen of the display apparatus 400 displaying the pattern data.

The example illustrated in FIG. 6A is an example of pattern data that displays the text "(x,y)" (integers of 1≤x≤22, 1≤y≤10), which represent positions of the blocks in the horizontal direction and the vertical direction, as the unique information of the blocks. Accordingly, which part of the display screen is being captured can be identified by, for example, the image processing circuit 24 identifying the text "(x,y)" included in the image captured of part of the display screen. Note that the unique information displayed in each block is not limited to text as long as the image capture apparatus 100 can identify the information, and graphics, colors, or the like may be used.

On the other hand, information on three-dimensional positions of a plurality of points of the display screen in the display apparatus 400 (e.g., the three-dimensional positions of at least three of the four vertices of the display screen) are provided to the image capture apparatus 100 from the display control apparatus 300. The image capture apparatus 100 can, based on the information of the three-dimensional positions of the display screen provided from the display control apparatus 300, identify a three-dimensional position of the captured image of the screen displaying the pattern data.

In step S303, the image capture apparatus 100 outputs the pattern data generated in step S302 to the display control apparatus 300 through the external I/F 19. The display control apparatus 300 stores the pattern data received through the first I/F 303 in the RAM 306. Then, based on the pattern data, the image processing circuit 302 generates image data to be output to the display apparatus 400. Note that the pattern data may be generated such that the pattern data is displayed only in the image capture range of the previous frame.

The display control apparatus 300 outputs the image data generated by the image processing circuit 302, along with an output instruction, to the display apparatus 400 through the second I/F 304. The display control apparatus 300 also outputs an image capture instruction to the image capture apparatus 100.

In step S304, the image capture apparatus 100 and the display apparatus 400 stand by until the timing for execution of image capture processing and display processing, respectively (time t3, here). The timing for execution is determined by a cycle communicated from the display control apparatus 300 during synchronization processing and the GenLock signal.

Upon reaching the timing for execution, in step S305, the display apparatus 400 executes a display based on the image data, and the image capture apparatus 100 executes image capturing. It is assumed here that the display apparatus 400 displays the image illustrated in FIG. 6A, and the image capture apparatus 100 captures the range indicated by the frame in FIG. 6B. In addition to the image based on the pattern data, a person present between the display apparatus 400 and the image capture apparatus 100 appears in the captured image. The image capture apparatus 100 captures an image under predetermined exposure conditions by focusing the lens unit 102 on the display screen, and captured image data is generated by the image processing circuit 125. The captured image data is stored in the memory 32. The exposure time (shutter speed) used during image capture is set such that flicker caused by the display frame rate, power supply frequency, and so on of the display apparatus 400 does not appear in the captured image.

In step S306, the position and orientation detection circuit 34 of the image capture apparatus 100 detects the position (spatial coordinates) and orientation of the image capture apparatus 100 from the captured image data and the three-dimensional position information of the display screen of the display apparatus 400. First, based on the captured image data, the position and orientation detection circuit 34 identifies which part of the display screen the image capture apparatus 100 has captured (the image capture range).

Then, the position and orientation detection circuit 34 detects the position and orientation of the image capture apparatus 100 using three-dimensional positions of at least six points (coordinates) within the captured image. The three-dimensional position corresponding to a point within the image can be obtained from the information on the three-dimensional position of the display screen supplied by the display control apparatus 300. For example, the position and orientation detection circuit 34 identifies, based on the information on the three-dimensional positions of the vertices of the display screen, or obtains, from the display control apparatus 300, the three-dimensional positions of at least six points included in the image based on the pattern data, appearing in the captured image. The three-dimensional positions may be, for example, centers (centers of gravity) of blocks, three-dimensional positions of points of intersection of a grid defining the blocks, or the like.

For example, if the three-dimensional positions of six points (coordinates) within the captured image can be identified, the position and orientation of the image capture apparatus 100 can be detected through a publicly-known method that solves the Perspective-6-Point (P6P) problem. The position and orientation detection circuit 34 stores the three-dimensional position and the orientation (e.g., the rotation angle of each axis of an orthogonal coordinate system relative to the direction of gravity) of the image capture apparatus 100 in the memory 32 as position and orientation information.

In step S307, the image capture apparatus 100 outputs the position and orientation information to the display control apparatus 300 through the medium I/F 18.

Figure 7A:
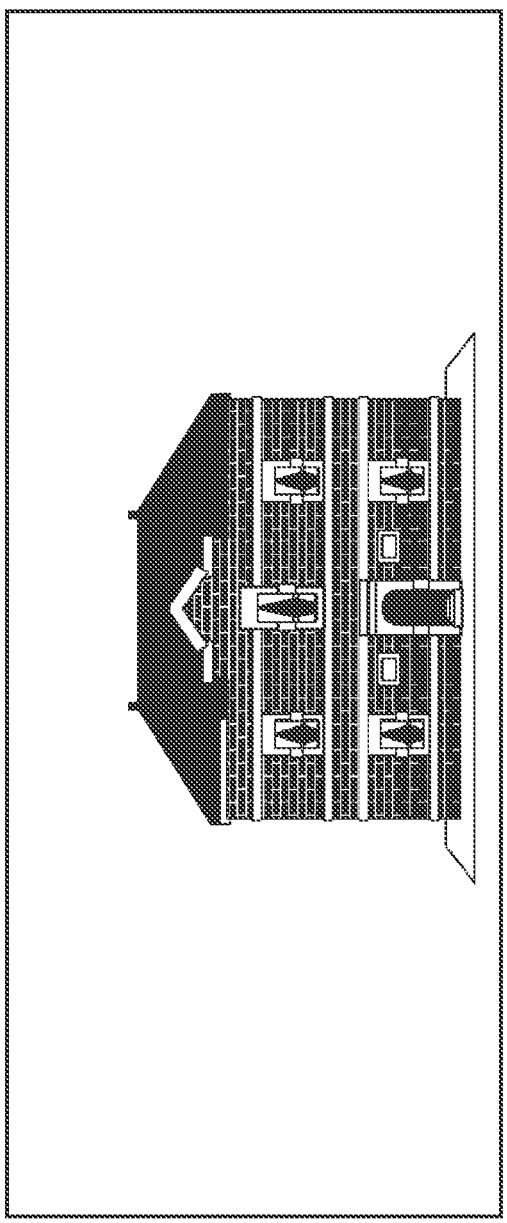
FIGS. 7A and 7B are diagrams illustrating an example of a background image and a video image capturing result according to embodiments.

In step S308, the display control apparatus 300 stores the position and orientation information, received through the first I/F 303, in the RAM 306. Then, the image processing circuit 302 generates CG data by rendering model data stored in the storage apparatus 307 in advance, using a viewpoint position and a viewing direction based on the position and orientation information. CG data corresponding to a video observed at a position in the display screen of the display apparatus 400 when the image capture apparatus 100 is placed in a virtual space (video image data) is obtained as a result. In other words, CG data representing an image without a sense of unnaturalness is generated according to the position and orientation of the image capture apparatus 100. FIG. 7A illustrates an example of the image represented by the CG data rendered according to the current position and orientation of the image capture apparatus 100. This image is used as a background, and is therefore called a "background image".

In step S309, the display control apparatus 300 outputs the background image data and an output instruction to the display apparatus 400 through the second I/F 304. The display control apparatus 300 also outputs an image capture instruction to the image capture apparatus 100 through the first I/F 303.

In step S310, the image capture apparatus 100 and the display apparatus 400 stand by until the timing for execution of image capture processing and display processing, respectively (time t4, here).

Figure 7B:
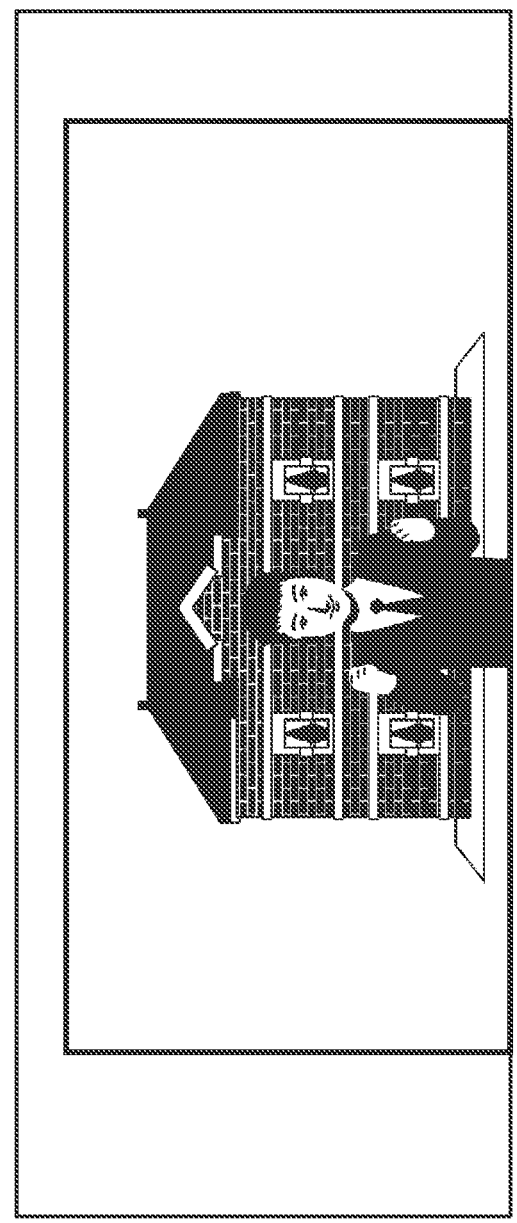

Upon reaching the timing for execution, in step S311, the display apparatus 400 executes a display based on the image data, and the image capture apparatus 100 executes image capturing. It is assumed here that the display apparatus 400 displays the image illustrated in FIG. 7A, and the image capture apparatus 100 captures the range indicated by the frame in FIG. 6B. In addition to the image based on the background image data, a person present between the display apparatus 400 and the image capture apparatus 100 appears in the captured image. The image indicated within the frame in FIG. 7B is captured as a result.

In step S312, the image capture apparatus 100 stores the captured in-camera VFX image in the recording medium 200.

In step S313, if an ending condition is not satisfied, the processing is continued for the next frame by repeating the processing from step S302. The ending condition may be any predetermined condition, such as, for example, that the image capture apparatus 100 has been switched to the playback mode, the power of the image capture apparatus 100 has been turned off, or the like.

Figure 8:
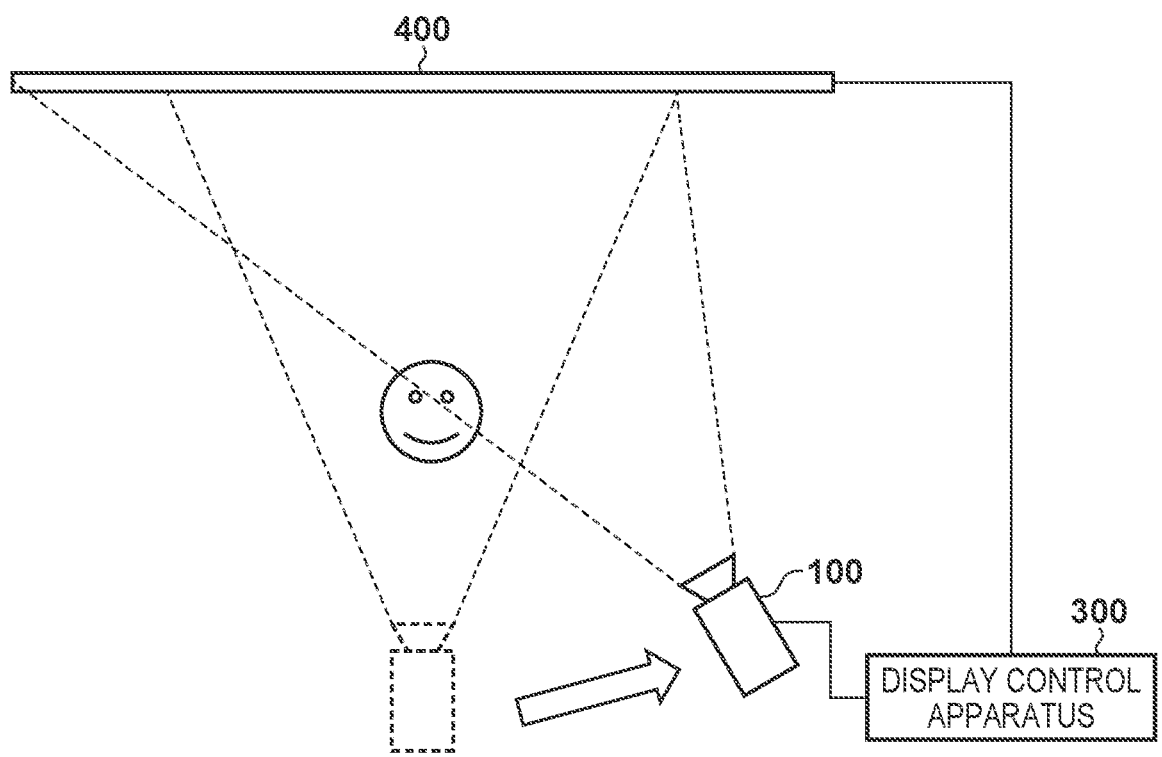
FIG. 8 is a schematic diagram illustrating movement of the image capture apparatus 100.
Figure 9B:
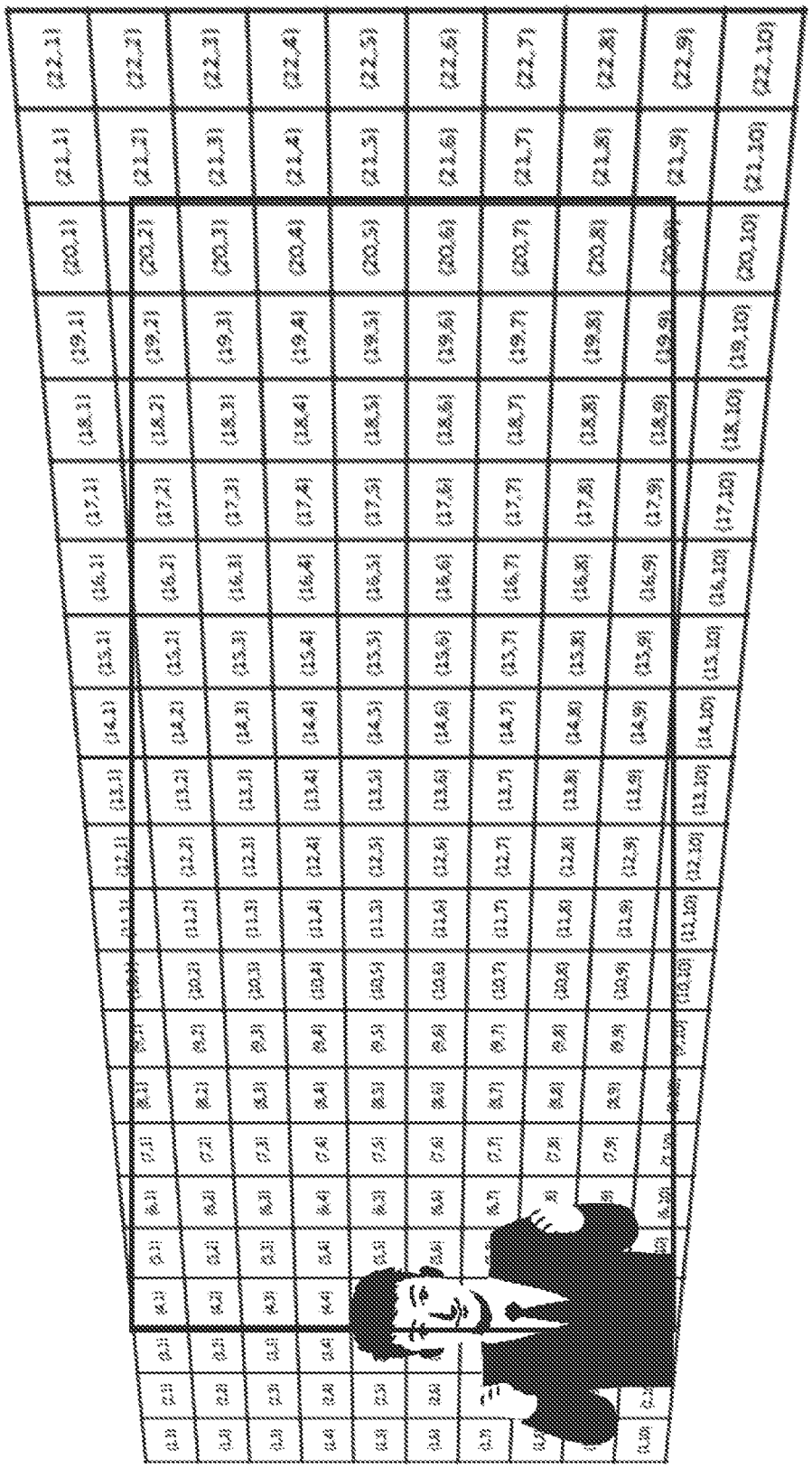

In the processing for the next frame, it is assumed that the image capture apparatus 100 has moved from the position indicated by the dotted lines to the position indicated by the solid lines in FIG. 8. The state in which the display apparatus 400 displays the image based on the pattern data and step S305 is illustrated in FIG. 9A. Although it is assumed here that the pattern data generated in step S302 does not change regardless of the movement of the image capture apparatus 100, the pattern data may be changed according to the relative positional relationship between the display screen of the display apparatus 400 and the image capture apparatus 100. FIG. 9B schematically illustrates the captured image (within the frame) obtained by the image capture apparatus 100 in step S305 and the state of the display screen.

In step S306, the position and orientation detection circuit 34 of the image capture apparatus 100 detects the position and orientation of the image capture apparatus 100 as described above.

In step S307, the position and orientation information is output from the image capture apparatus 100 to the display control apparatus 300.

Figure 10A:
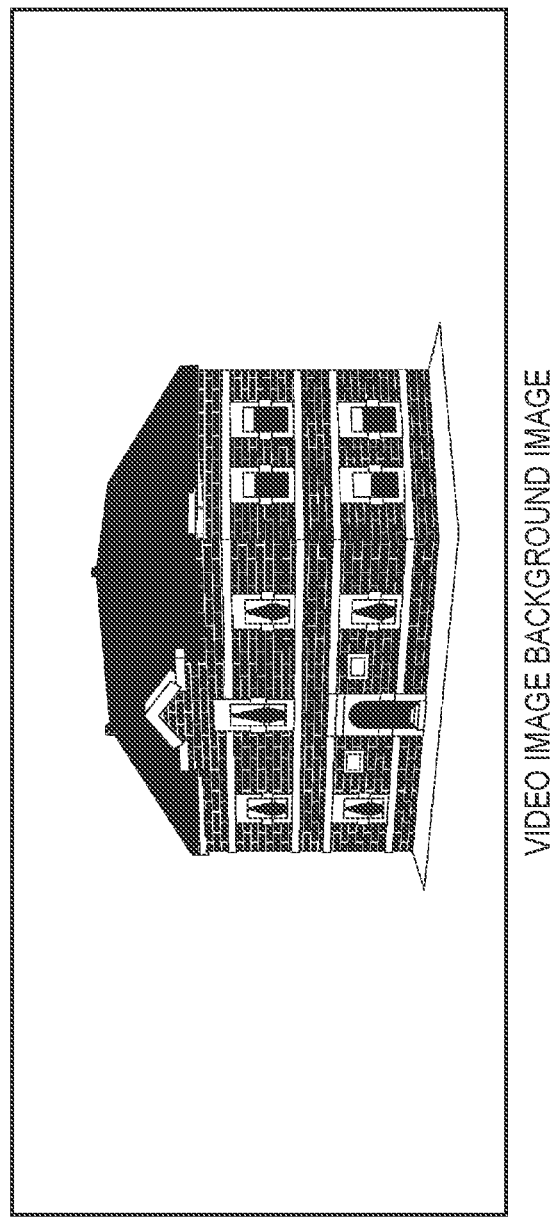

In step S308, the display control apparatus 300 generates CG data of a background image based on the position and orientation information. The background image changes as illustrated in FIG. 10A in response to the image capture direction of the image capture apparatus 100 changing. Then, in step S311 (time t7 in FIG. 5B), the captured image indicated within the frame in FIG. 10B is obtained.

Although the pattern data is displayed and the position and orientation of the image capture apparatus are detected for each frame in the above-described example, the position and orientation may be detected once every plurality of frames. In this case, for frames in which the position and orientation are not detected, CG based on the most recently detected position and orientation is displayed repeatedly.

Additionally, the position and orientation may be detected at a frequency according to the magnitude of the motion of the image capture apparatus 100 detected by the gyro 40. When the image capture apparatus 100 is at rest or the magnitude of the motion is less than a threshold, the frequency at which the position and orientation are detected may be reduced compared to when the motion is greater than or equal to the threshold.

In this manner, according to the present embodiment, the position and orientation of the image capture apparatus are detected from a captured image obtained in a state where a pattern image for detecting the position and orientation of the image capture apparatus is displayed in the background, and CG generated based on the detected position and orientation is displayed on the background. Accordingly, a VFX image having a CG background according to the position and orientation of the image capture apparatus can be obtained directly by the image capture apparatus, without using an external device for detecting the position and orientation of the image capture apparatus.

Second Embodiment

A second embodiment will be described next. In the present embodiment, the display control apparatus 300 detects the position and orientation of the image capture apparatus 100. Accordingly, the image capture apparatus 100 outputs, to the display control apparatus 300, data of a captured image obtained in a state where an image based on pattern data is displayed. The display control apparatus 300 detects the position and orientation of the image capture apparatus 100 in the same manner as the position and orientation detection circuit 34 according to the first embodiment. The generation of CG based on the position and orientation of the image capture apparatus 100, the control of the display and image capture timing, and the like are similar to those of the display control apparatus 300 according to the first embodiment.

Figure 11:
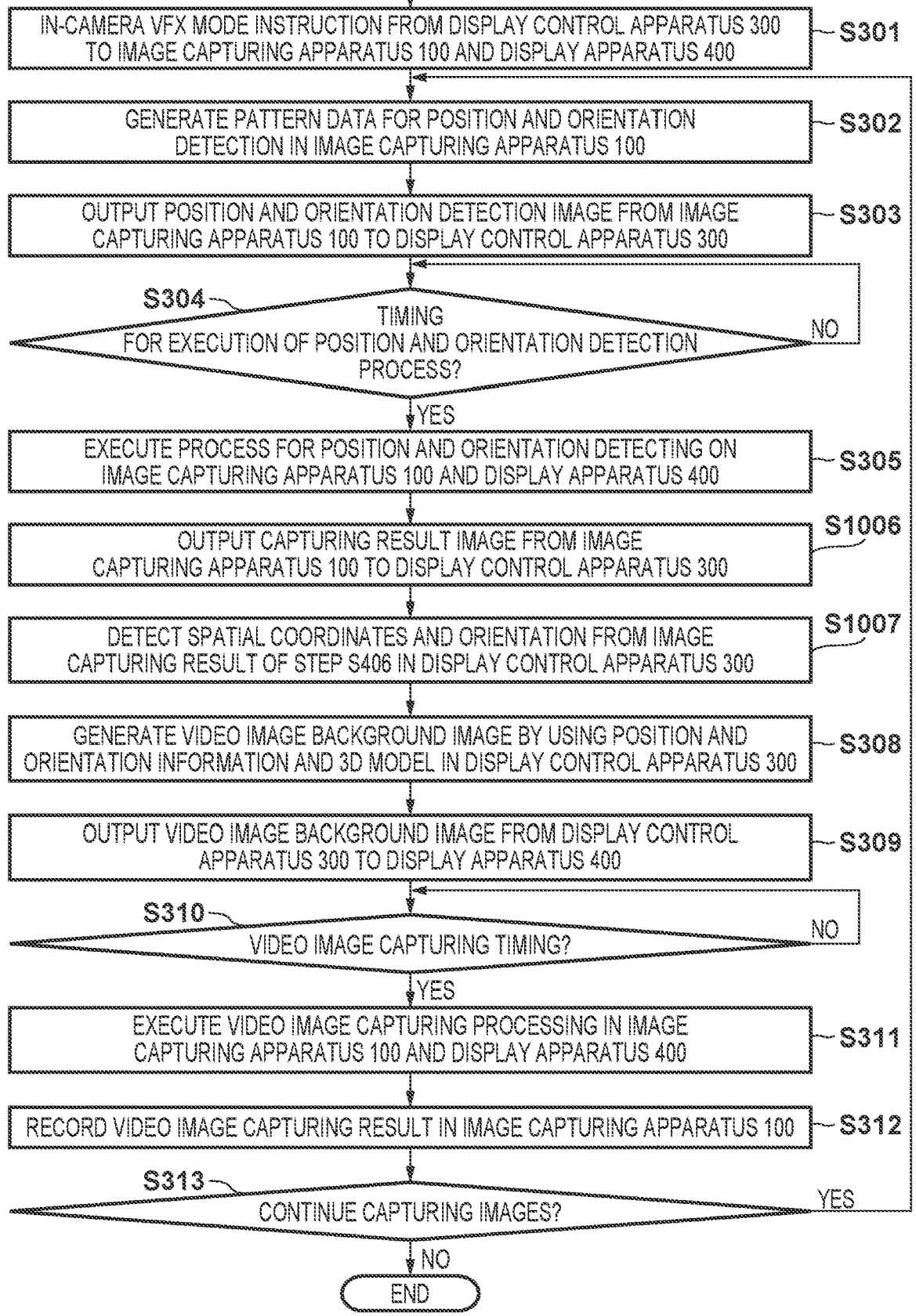
FIG. 11 is a flowchart pertaining to operations by the image capture system according to a second embodiment.

FIG. 11 is a flowchart pertaining to overall operations of the image capture system 1, similar to FIG. 4. Additionally, FIGS. 12A and 12B are timing charts illustrating operation timings of the respective apparatuses, with respect to the flowchart in FIG. 11, similar to FIGS. 5A and 5B. The present embodiment will be described next with reference to FIGS. 11 to 12B. The configuration of the image capture system 1 is similar to that of the first embodiment, and will therefore not be described.

Steps S301 to S305 are similar to those of the first embodiment, and will therefore not be described. In step S1006, the image capture apparatus 100 transmits the image data captured in step S305 to the display control apparatus 300 through the external I/F 19 (FIG. 12A, 1201). In the present embodiment, the position and orientation detection circuit 34 of the image capture apparatus 100 is not used.

In step S1007, the display control apparatus 300 stores the image data obtained by capturing a screen displaying the pattern data, received from the image capture apparatus 100 through the first I/F 303, in the RAM 306. Then, the display control apparatus 300 (the control circuit 301) detects the position and orientation of the image capture apparatus 100 in the same manner as the position and orientation detection circuit 34 according to the first embodiment, and stores the position and orientation information in the RAM 306 (FIG. 12A, 1202).

In step S308, the display control apparatus 300 generates the background image (CG) using the position and orientation information obtained in step S1007, without receiving the position and orientation information from the image capture apparatus 100 (FIG. 12A, 1203). The subsequent processing is similar to that of the first embodiment, and will therefore not be described.

In the present embodiment, the display control apparatus 300 detects the position and orientation of the image capture apparatus 100. Accordingly, in addition to effects similar to those of the first embodiment, the processing load on the image capture apparatus 100 can be lightened, and the position and orientation detection can be accelerated.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the claims is not limited to the disclosed exemplary embodiments. The scope of the following claims is to be accorded the broadest interpretation so as to encompass all such modifications and equivalent structures and functions.

This application claims the benefit of Japanese Patent Application No. 2022-021432, filed on Feb. 15, 2022, which is hereby incorporated by reference herein in its entirety.

What is claimed is:

1. An image capture apparatus comprising:
   one or more processors that execute a program stored in a memory and thereby function as a controller that controls operation of the image capture apparatus,
   wherein the controller controls the image capture apparatus so as to repeatedly execute (1) to (3):
   (1) output, to an external, data for detecting a position and orientation of the image capture apparatus;
   (2) capture a first image of an external display apparatus displaying an image based on the data; and
   (3) capture, a second image, of which background is the external display apparatus displaying a third image that is generated in accordance with the position and orientation of the image capture apparatus detected based on the first image, and
   wherein the controller controls the image capture apparatus such that frequencies of (1) and (2) to be lower when a magnitude of motion of the image capture apparatus is less than a threshold than when the magnitude is greater than or equal to the threshold.

2. The image capture apparatus according to claim 1, wherein the image capture apparatus captures a part of a display screen of the external display apparatus, and the image based on the data is an image that enables the image capture apparatus to identify which part of the display screen has been captured by the image capture apparatus from data of the second image.

3. The image capture apparatus according to claim 1, wherein the third image is computer graphics (CG) representing a virtual space observed from the image capture apparatus.

4. The image capture apparatus according to claim 1, wherein the first image and the second image are captured according to control by an external device different from the external display apparatus.

5. The image capture apparatus according to claim 4, wherein the controller further controls the image capture apparatus so as to:
   output, for the external device to detect the position and orientation of the image capture apparatus, the first image.

6. The image capture apparatus according to claim 4, wherein the controller further controls the image capture apparatus so as to:
   detect the position and orientation of the image capture apparatus based on the first image and a plurality of three-dimensional positions of the external display apparatus; and
   output, to the external device, information on the position and orientation detected.

7. The image capture apparatus according to claim 6, wherein the plurality of three-dimensional positions are supplied from the external device.

8. A control method executed by an image capture apparatus, the control method comprising:
   (1) outputting, to an external, data for detecting a position and orientation of the image capture apparatus;

(2) capturing a first image of an external display apparatus displaying an image based on the data; and
(3) capturing, a second image, of which background is the external display apparatus displaying a third image that is generated in accordance with the position and orientation of the image capture apparatus detected based on the first image, and wherein (1) to (3) are repeatedly executed and execution frequencies of (1) and (2) are lower when a magnitude of motion of the image capture apparatus is less than a threshold than when the magnitude is greater than or equal to the threshold.

9. A non-transitory computer-readable medium storing one or more programs including executable instructions for causing a computer of an image capture apparatus to repeatedly execute:
(1) outputting, to an external, data for detecting a position and orientation of the image capture apparatus;
(2) capturing a first image of an external display apparatus displaying an image based on the data; and
(3) capturing, a second image, of which background is the external display apparatus displaying a third image that is generated in accordance with the position and orientation of the image capture apparatus detected based on the first image, and wherein execution frequencies of (1) and (2) are lower when a magnitude of motion of the image capture apparatus is less than a threshold than when the magnitude is greater than or equal to the threshold.

* * * * *